(12) United States Patent
Ostwal et al.

(10) Patent No.: US 10,880,213 B2
(45) Date of Patent: Dec. 29, 2020

(54) BUILDING MANAGEMENT SYSTEM NETWORK WITH POWER CONSERVATION VIA ADAPTIVE USE OF NETWORK PROTOCOLS

(71) Applicant: Johnson Controls Technology Company, Auburn Hills, MI (US)

(72) Inventors: Shrey Ostwal, Maharashtra (IN); Anushka Gupta, Karnataka (IN); Zafar Alam Siddiqui, Allahabad (IN); Kranthi Kiran Reddy Gurijala, Hyderabad (IN); Ankur Thareja, Rajasthan (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 14 days.

(21) Appl. No.: 16/270,531

(22) Filed: Feb. 7, 2019

(65) Prior Publication Data

US 2019/0260674 A1 Aug. 22, 2019

Related U.S. Application Data

(60) Provisional application No. 62/632,807, filed on Feb. 20, 2018.

(51) Int. Cl.
| | | |
|---|---|---|
| *H04L 12/741* | (2013.01) | |
| *G05B 19/042* | (2006.01) | |
| *H04W 52/02* | (2009.01) | |
| *F24F 11/58* | (2018.01) | |
| *H04W 84/18* | (2009.01) | |

(52) U.S. Cl.
CPC ............ *H04L 45/74* (2013.01); *G05B 19/042* (2013.01); *H04W 52/0229* (2013.01); *F24F 11/58* (2018.01); *G05B 2219/2614* (2013.01); *H04W 84/18* (2013.01)

(58) Field of Classification Search
CPC ... H04L 45/74; G05B 19/042; H04W 52/0229
See application file for complete search history.

(56) References Cited

U.S. PATENT DOCUMENTS

| | | | |
|---|---|---|---|
| 2001/0015962 A1* | 8/2001 | Iwakuni | H04J 3/12 |
| 2002/0018481 A1* | 2/2002 | Mor | H04L 12/28 |
| 2005/0128998 A1* | 6/2005 | Jelitto | H04J 3/14 |
| 2014/0105063 A1 | 4/2014 | Jeong et al. | |

(Continued)

OTHER PUBLICATIONS

International Search Report and Written Opinion for International Application No. PCT/US2019/017122, dated Apr. 18, 2019, 13 pages.

(Continued)

*Primary Examiner* — Ronald B Abelson
(74) *Attorney, Agent, or Firm* — Foley & Lardner LLP

(57) ABSTRACT

One implementation of the present disclosure is a system including a data network, a source device, and a target device. The data network is configured to wirelessly communicate data, the source device is configured to wirelessly communicate data, and the target device is configured to wirelessly communicate data. The target device and the source device utilize a first medium access control (MAC) protocol during a first time interval of a duty cycle and a second MAC protocol during a second time interval of the duty cycle.

20 Claims, 11 Drawing Sheets

(56) References Cited

U.S. PATENT DOCUMENTS

2014/0376623 A1* 12/2014 Good .............. H04N 19/00236
2016/0330285 A1 11/2016 Brophy et al.

OTHER PUBLICATIONS

Injong Rhee et al., Z-MAC: A Hybrid MAC for Wireless Sensor Networks, IEEE/ACM Transactions on Networking, vol. 16, No. 3, Jun. 1, 2008, 14 pages.

* cited by examiner

BUILDING MANAGEMENT SYSTEM NETWORK WITH POWER CONSERVATION VIA ADAPTIVE USE OF NETWORK PROTOCOLS

CROSS REFERENCE TO RELATED APPLICATION

This application claims the benefit of U.S. Provisional Patent Application No. 62/632,807, filed Feb. 20, 2018, which is incorporated herein by reference in its entirety.

BACKGROUND

A building management system (BMS) is, in general, a system of devices configured to control, monitor, and manage equipment in or around a building or building area. A BMS can include a controller, a heating, ventilation, and air conditioning (HVAC) system, a security system, a lighting system, a fire alerting system, and any other system that is capable of managing building functions or devices, or any combination thereof. A BMS may include a variety of devices (e.g., HVAC devices, controllers, chillers, fans, sensors, etc.) configured to facilitate monitoring and controlling the building space. Devices can be configured to communicate with other devices via a network, such as a Building Automation and Control network (BACnet) or a Master-Slave Token Passing (MSTP) Network.

The BMS can utilize one or both of a wired sensor network and a wireless sensor network (WSN). A WSN can provide similar functionality as a wired network without relying on physical connections among sensor nodes in the network. However, implementation of a WSN involves various challenges, including wireless network complexity, reliability, node lifetime, battery maintenance, and the like. For example, battery-powered wireless sensor nodes are usually dispersed throughout various remote locations, and battery replacement is often tedious and costly.

A WSN configured to consume less battery power and that is backwards-compatible with the existing hardware and software is thus desirable to reduce down time and/or service periods.

SUMMARY

One implementation of the present disclosure is a system including a data network, a source device, and a target device, according to some embodiments. In some embodiments, the data network is configured to wirelessly communicate data. In some embodiments, the source device is configured to wirelessly communicate data. In some embodiments, the target device is configured to wirelessly communicate data. In some embodiments, the target device and the source device utilize a first medium access control (MAC) protocol during a first time interval of a duty cycle and a second MAC protocol during a second time interval of the duty cycle.

In some embodiments, the first time interval includes a guard time interval and a resynchronization interval. In some embodiments, the second time interval includes a data collection interval.

In some embodiments, the first MAC protocol is a carrier-sense multiple access protocol.

In some embodiments, the second MAC protocol is an X-MAC protocol.

In some embodiments, the target device receives multiple data packets during the second time interval. In some embodiments, at least one data packet of the multiple data packets is received from the source device. In some embodiments, at least a second data packet of the multiple data packets is received from a second source device.

In some embodiments, the target device includes a buffer queue to store the multiple data packets.

In some embodiments, the source device is a sensor configured to measure an environmental condition.

In some embodiments, the target device is configured to enter a low power listening (LPL) mode after the resynchronization interval.

In some embodiments, the source device is configured to transmit an initiation data packet. In some embodiments, the initiation packet includes a preamble with a target address.

In some embodiments, the target device is configured to receive the initiation data packet, determine if the target address matches an address of the target device, and send an acknowledgement data packet to the source device in response to the target address matching the address of the target device. In some embodiments, the acknowledgement data packet includes an indication that the target address matches the address of the target device.

In some embodiments, the target device is configured to enter the LPL mode in response to the target address not matching the address of the target device.

Another implementation of the present disclosure is a building management system (BMS) including a wireless sensor, a source device, and a target device. In some embodiments, the wireless sensor network (WSN) is configured to communicate data among multiple BMS devices. In some embodiments, the source device is configured to wirelessly communicate data. In some embodiments, the target device is configured to wirelessly communicate data. In some embodiments, the target device and the source device utilize a first medium access control (MAC) protocol during a first time interval of a duty cycle and a second MAC protocol during a second time interval of the duty cycle.

In some embodiments, the first time interval includes a guard time interval and a resynchronization interval. In some embodiments, the second time interval includes a data collection interval.

In some embodiments, the first MAC protocol is a carrier-sense multiple access protocol. In some embodiments, the second MAC protocol is an X-MAC protocol.

In some embodiments, the target device receives multiple data packets during the second time interval. In some embodiments, at least one data packet of the multiple data packets is received from the source device and at least a second data packet of the multiple data packets is received from a second source device.

In some embodiments, the source device is a sensor configured to measure an environmental condition.

In some embodiments, the target device is configured to enter a low power listening (LPL) mode after the resynchronization interval.

In some embodiments, the source device is configured to transmit an initiation data packet. In some embodiments, the initiation packet has a preamble with a target address.

In some embodiments, the target device is configured to receive the initiation data packet, determine if the target address matches an address of the target device, and send an acknowledgement data packet to the source device in response to the target address matching the address of the target device. In some embodiments, the acknowledgement data packet includes an indication that the target address matches the address of the target device.

In some embodiments, the target device is configured to enter the LPL mode in response to the target address not matching the address of the target device.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Some embodiments will become more fully understood from the following detailed description, taken in conjunction with the accompanying drawings, wherein like reference numerals refer to like elements.

DETAILED DESCRIPTION

Overview

Referring generally to the FIGURES, systems, methods, and components thereof are shown for power conservation with adaptive network protocols, according to some embodiments. Some example embodiments described herein are configured to decrease node duty cycles by adaptively switching between multiple medium access control (MAC) protocols in a wireless sensor network (WSN). In some embodiments, a building management system (BMS) includes a WSN having a parent node and a child node. A WSN can be configured to adaptively use two or more MAC layer protocols in a single protocol stack for reduced power consumption and improving performance. An example protocol stack, (e.g., DISSense) can use carrier-sense multiple access with collision avoidance (CMSA/CA) for medium accessing. CMSA/CA can be used during resynchronization and tree building interval and can be replaced with a periodic preamble based approach (e.g., X-MAC) during the Data Collection Interval of an active period. The short preamble approach of X-MAC reduces energy usage at both the transmitter and receiver and offers additional advantages such as increased scalability. In some embodiments, a new protocol stack, DISSense-X, can provide a very low duty cycle and reliable data delivery, even with increased network size, while maintaining qualities of DISSense, such as adaptable active period for reducing the overall duty cycle and reliable data delivery to the sink.

Building HVAC Systems and Building Management Systems

Figure 1:
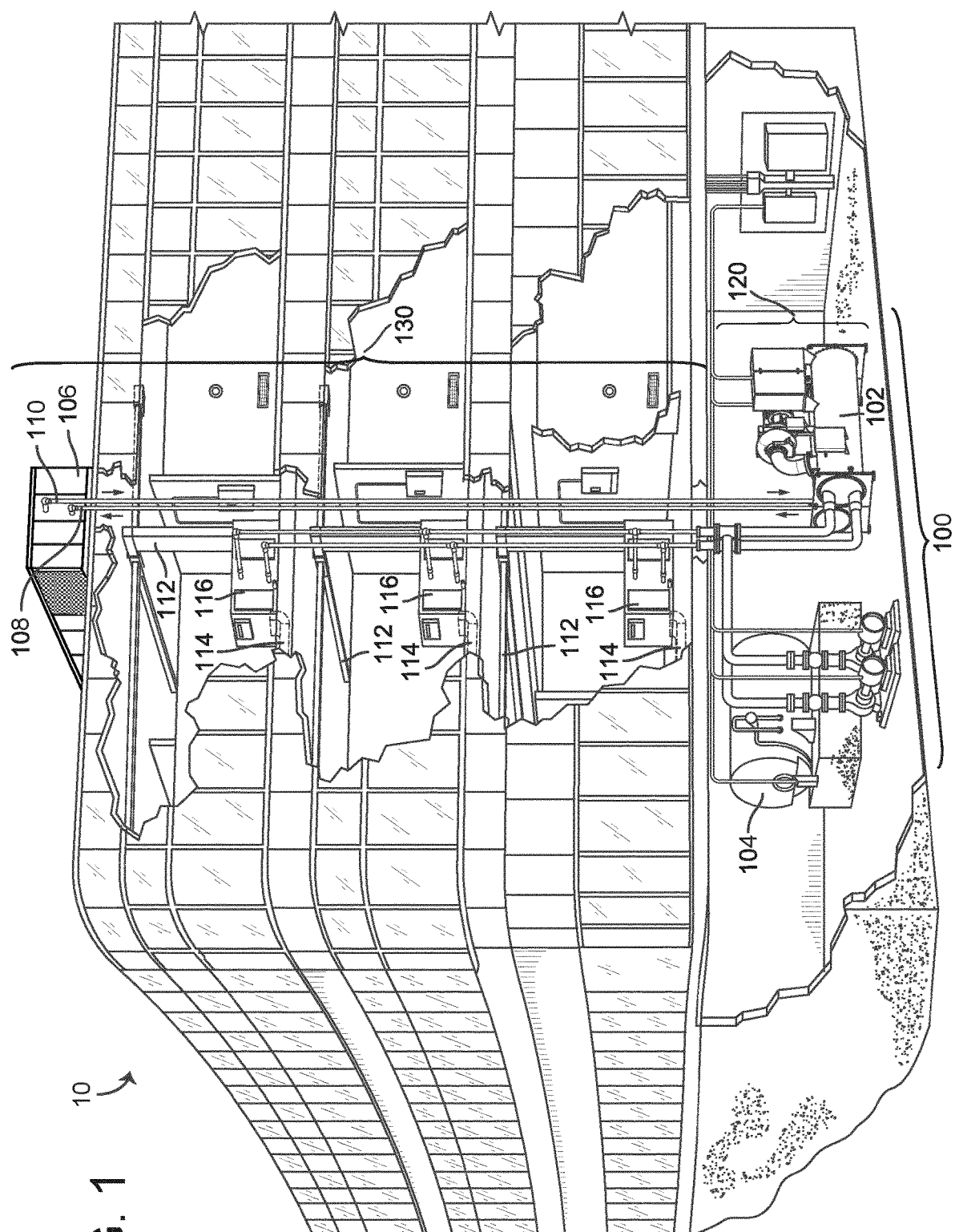
FIG. 1 is a drawing of a building equipped with a heating, ventilation, or air conditioning (HVAC) system, according to some embodiments.
Figure 2:
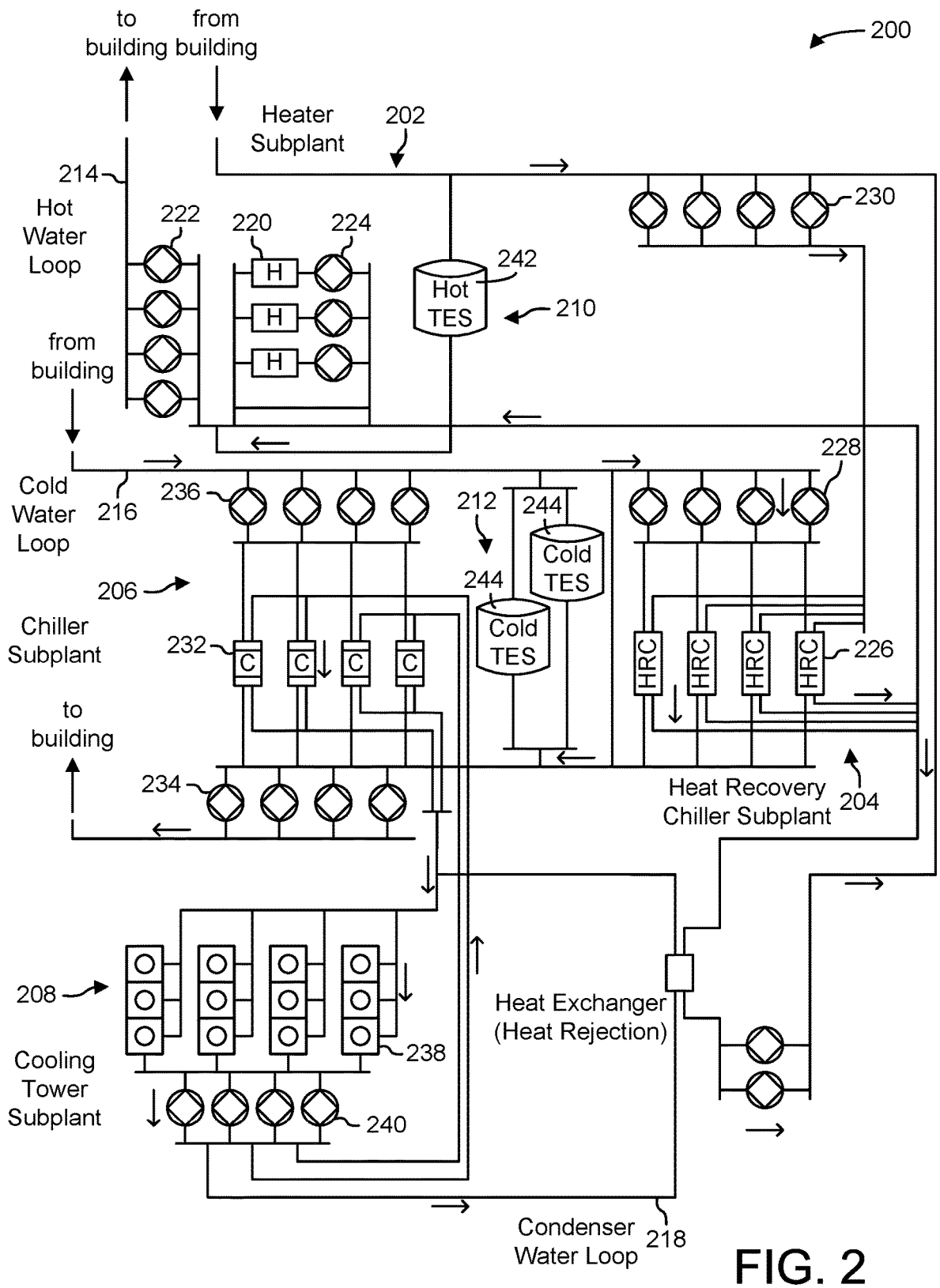
FIG. 2 is a drawing of a waterside system which can be used in combination with the HVAC system of FIG. 1, according to some embodiments.
Figure 3:
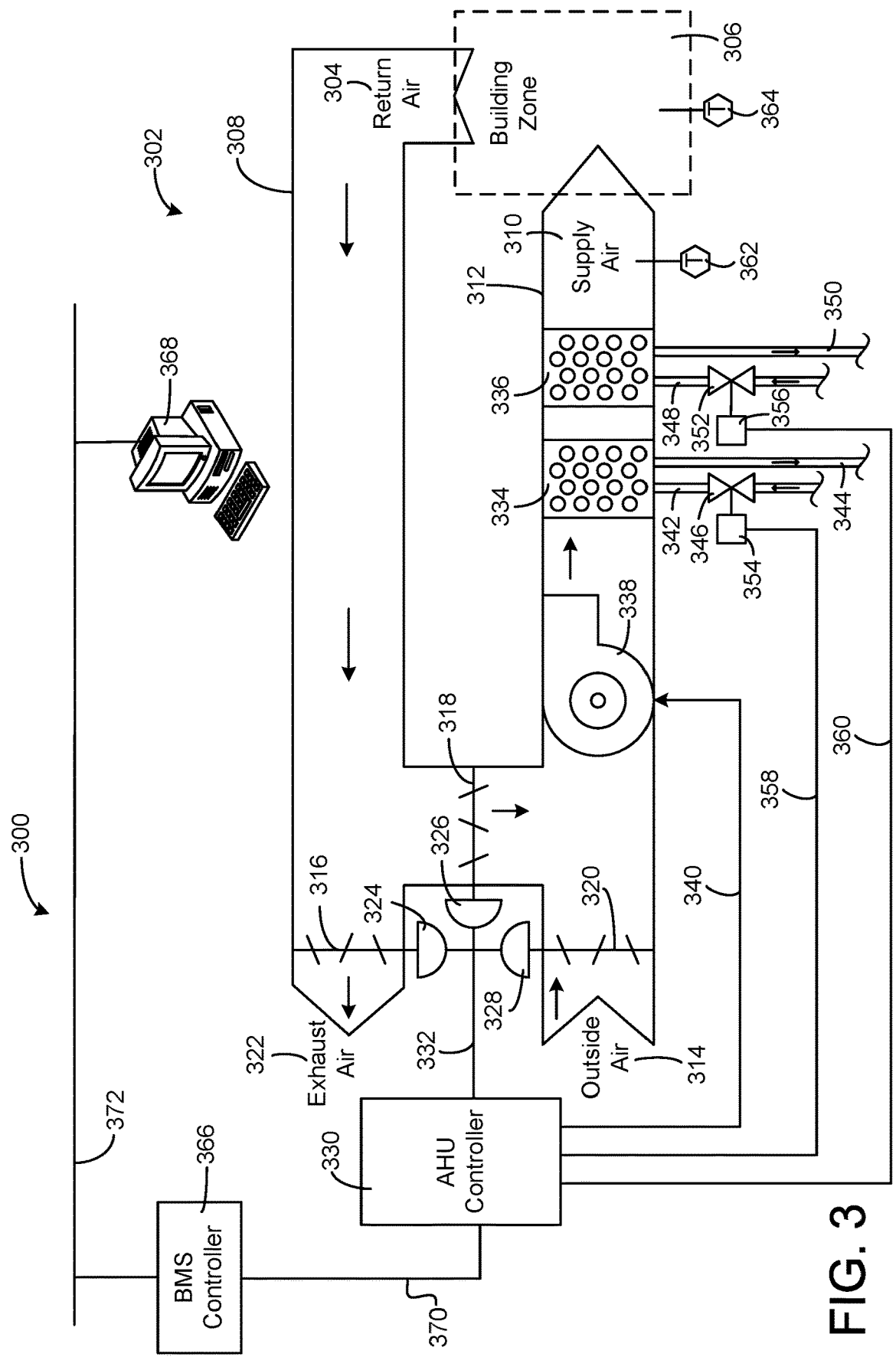
FIG. 3 is a drawing of an airside system which can be used in combination with the HVAC system of FIG. 1, according to some embodiments.
Figure 4:
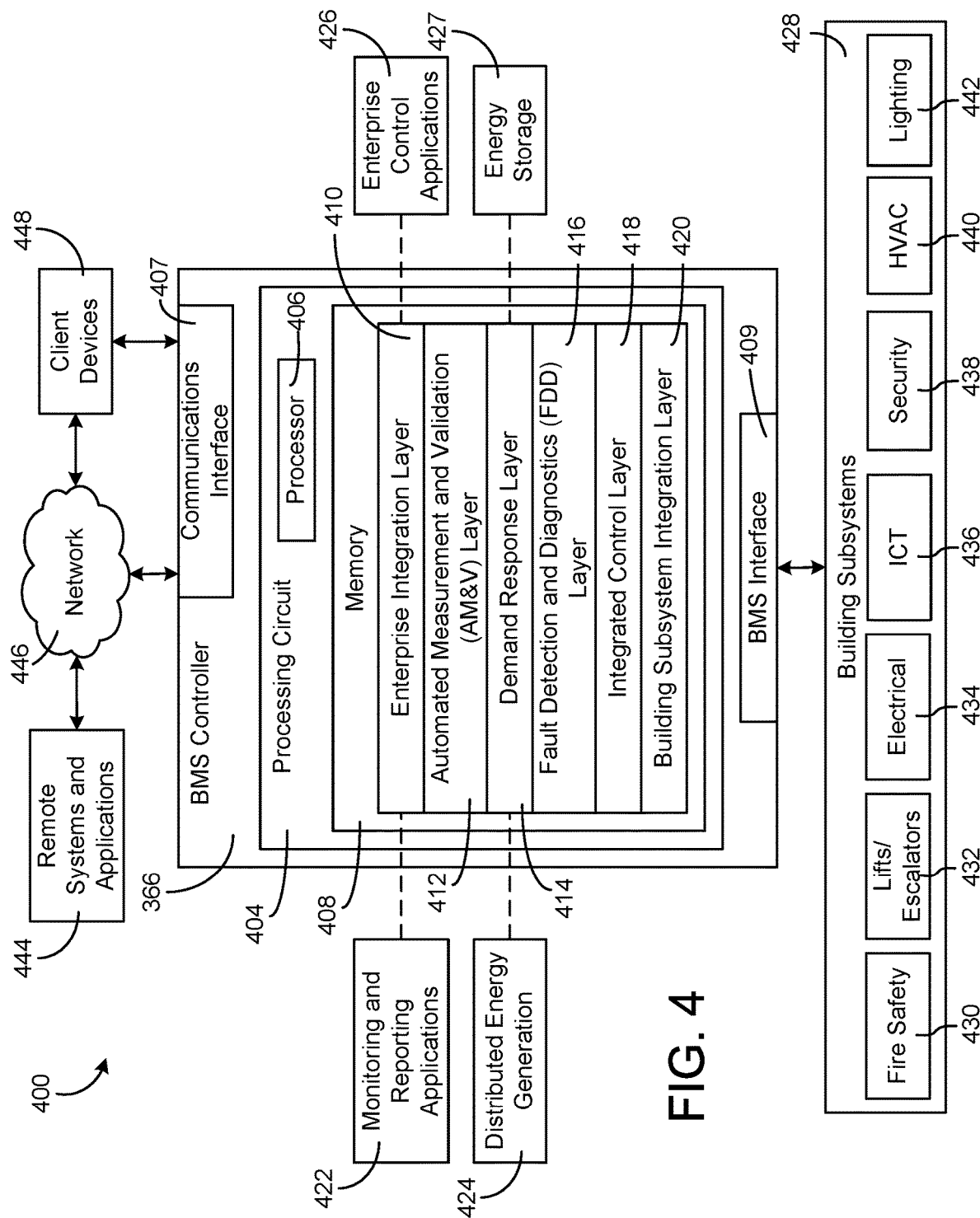
FIG. 4 is a block diagram of a building management system which can be used to monitor and control the building and HVAC system of FIG. 1, according to some embodiments.
Figure 5:
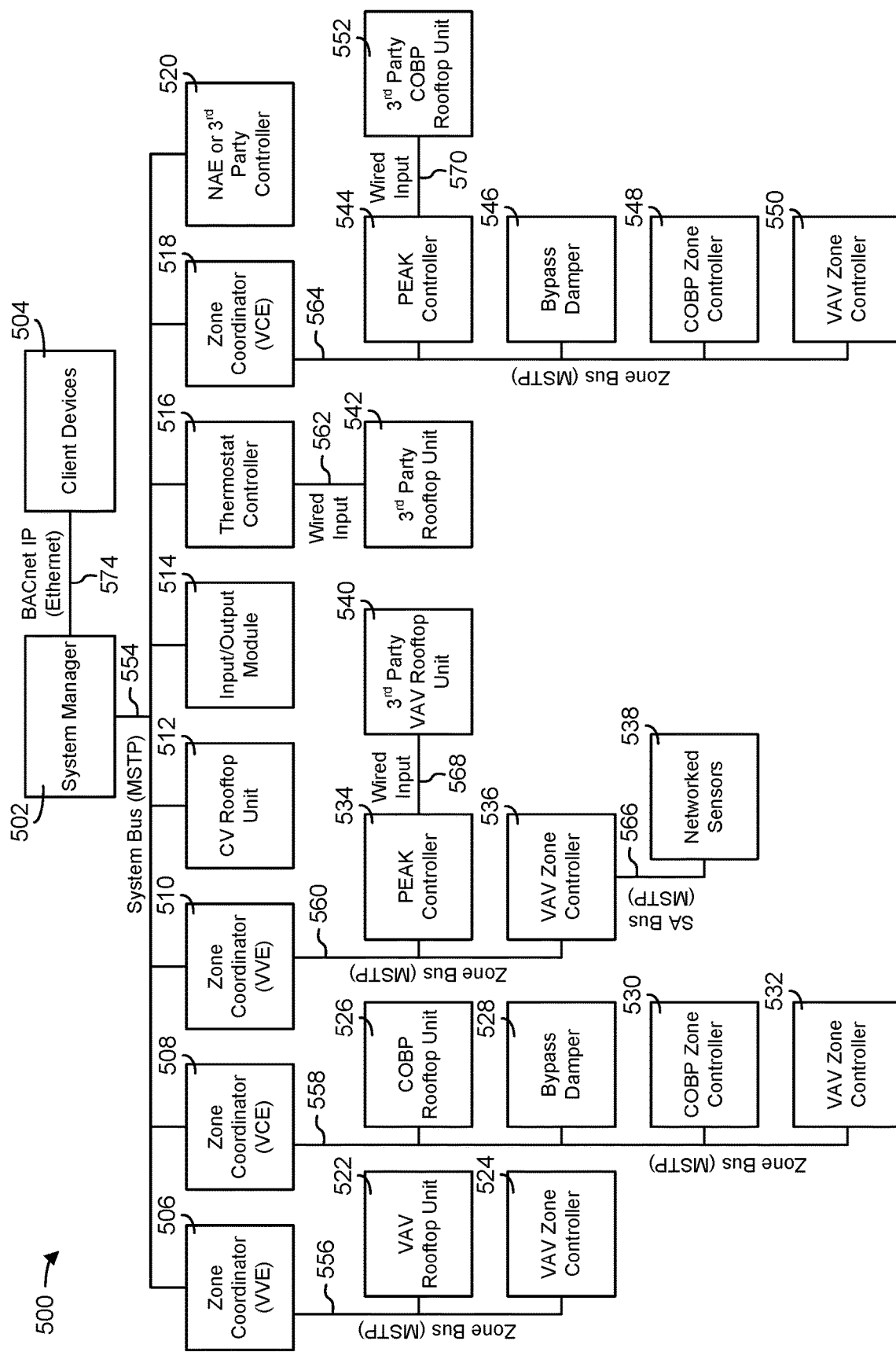
FIG. 5 is a block diagram of another building management system which can be used to monitor and control the building and HVAC system of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG.

1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

In some embodiments, HVAC system 100 uses free cooling to cool the working fluid. For example, HVAC system 100 can include one or more cooling towers or heat exchangers which transfer heat from the working fluid to outside air. Free cooling can be used as an alternative or supplement to mechanical cooling via chiller 102 when the temperature of the outside air is below a threshold temperature. HVAC system 100 can switch between free cooling and mechanical cooling based on the current temperature of the outside air and/or the predicted future temperature of the outside air.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, waterside system 200 uses free cooling to cool the water in cold water loop 216. For example, the water returning from the building in cold water loop 216 can be delivered to cooling tower subplant 208 and through cooling towers 238. Cooling towers 238 can remove heat from the water in cold water loop 216 (e.g., by transferring the heat to outside air) to provide free cooling for the water in cold water loop 216. In some embodiments, waterside system 200 switches between free cooling with cooling tower subplant 208 and mechanical cooling with chiller subplant 208 based on the current temperature of the outside air and/or the predicted future temperature of the outside air. An example of a free cooling system which can be used in waterside system 200 is described in greater detail with reference to FIG. 6.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

In some embodiments, AHU controller 330 uses free cooling to cool supply air 310. AHU controller 330 can switch between free cooling and mechanical cooling by operating outside air damper 320 and cooling coil 334. For example, AHU controller 330 can deactivate cooling coil 334 and open outside air damper 320 to allow outside air 314 to enter supply air duct 312 in response to a determination that free cooling is economically optimal. AHU controller 330 can determine whether free cooling is economically optimal based on the temperature of outside air 314 and/or the predicted future temperature of outside air 314. For example, AHU controller 330 can determine whether the temperature of outside air 314 is predicted to be below a threshold temperature for a predetermined amount of time. An example of free cooling switching logic which can be used by AHU controller 330 is described in greater detail with reference to FIG. 10.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Adaptive MAC Protocol Use for WSN

Referring generally to FIGS. 6-11, systems and methods for power conservation with adaptive network protocols are shown according to some embodiments. In some embodiments, one or more communication protocols may be configured such that nodes or devices may consume less power and/or increase the life of the system. In current and existing systems, for example, power consumption of a sensor node often results from using the radio for the transmission and reception of messages, and managing the ON and OFF time of transceiver modules may reduce the power consumption (e.g., via placing the radio in a sleep or LPL mode). The longer a node is in the LPL mode, the lower is its duty cycle and thus less power is consumed. Usually, a duty cycle less than 0.5% of active phase is acceptable. Often, however, the effectiveness of duty cycle depends on the level of cooperation between network protocols (e.g., the MAC and Routing protocols). Furthermore, latency, reliability, and size of the networks are also factors that may affect performance. A routing protocol that reacts immediately to the network changes and provides a reliable path to carry out the communication and minimizes data loss is also important. But, there is a trade-off between the reliability and the low power consumption. Latency increases with the increase of the network size because of the increase in the number of hops. A compromise is made between low latency and low power consumption, since low duty cycle approaches lead to high latency (nodes generally do not listen when in LPL mode to preserve battery).

Figure 6:
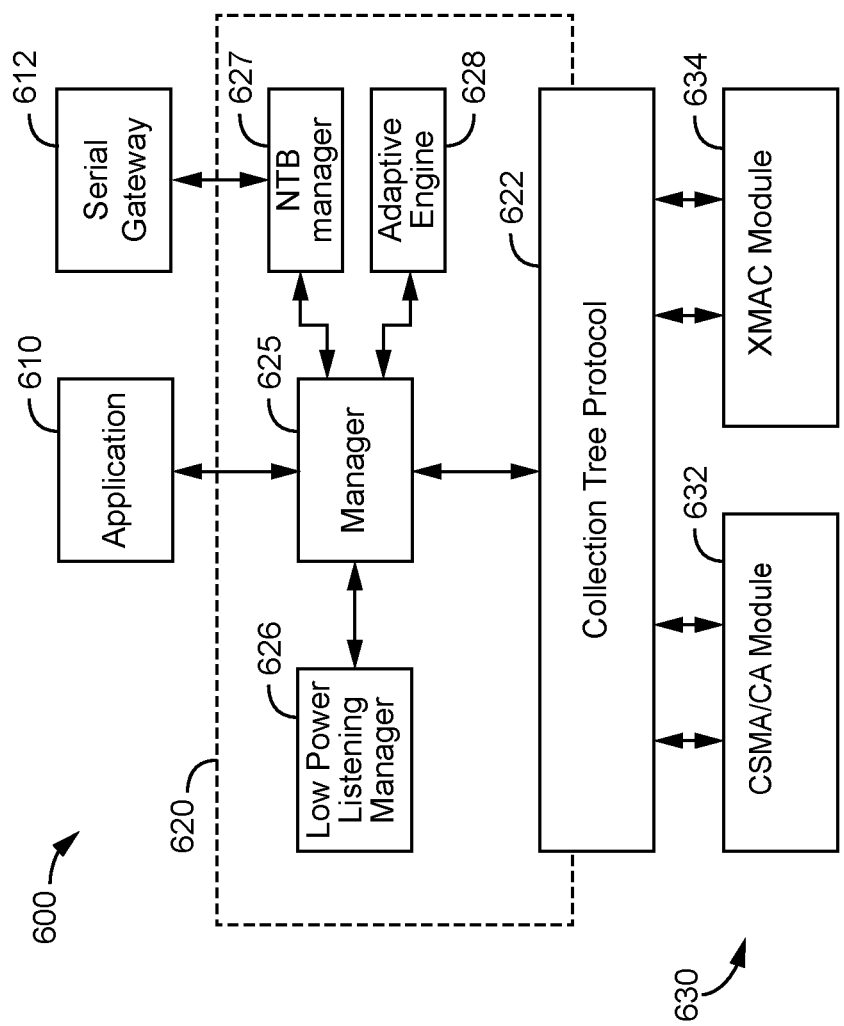
FIG. 6 is a block diagram of several elements for an exemplary wireless sensor network using multiple medium access control (MAC) protocols, according to some embodiments.

Referring to FIG. 6, an exemplary architecture 600 for power conservation with adaptive network protocols is shown, according to some embodiments. The architecture 600 includes an application element 610, a serial gateway 612, and a management system 620. In some embodiments, the management system 620 is configured to control the collection tree protocol 622 for an adaptive multiple MAC layer 630.

In some embodiments, the adaptive multiple MAC layer 630 configures the protocol to include an active period mode and a low power listening (LPL) mode. In some embodiments the active mode is configured with a higher duty cycle than the LPL mode. For example, a duty cycle in LPL mode may be minimized to a value between 0.1%-1%. It should be understood that the active mode and the LPL mode may be configured with any suitable duty cycle in various embodiments.

In some embodiments, an active period includes three intervals: (1) guard time (GT); (2) resynchronization interval (RI); and (3) data collection interval (DCI). In some embodiments, the GT can be configured to account for clock drifts and provide a buffer to the nodes, for example because the nodes were under long inactivity periods during the ultra-low power listening modes. In some embodiments, the RI can be configured to compensate the clock drifts, share the duration of each interval of next cycle, and/or build a collection tree with sink as the root of the tree network. Accordingly, by the end of the RI, each node as a parent selected in the tree can share a common wake-up time for the next active period. In some embodiments of the GT and RI, a carrier-sense multiple access with collision avoidance ("CMSA/CA") MAC protocol 632 can be implemented since building the tree and compensating clock drifts should be accomplished quickly and the transceiver should work with up to 100% duty cycle during these intervals. During the DCI, an X-MAC protocol 634 can be implemented. It is a preamble based and transmitter initiated MAC protocol where the duty cycle is less than 1%.

The management system 620 is shown to include a manager 625, a LPL manager 626, an NTP manager 627, and an adaptive engine 628. In some embodiments, the manager 625 is configured to handle one or more core functionalities, such as network re-synchronization and schedule management. In some embodiments, the manager 625 is configured to start, pause, and reset the underlying collection tree protocol 622, and the manager 625 may also change the radio duty cycle. The adaptive engine 628 may be configured to compute interval length for each of GT, RI, and/or DCI.

In some embodiments, the LPL manager 626 is configured for communication during Ultra-Low-Power Mode. The low power listening manager 626 enables a node that loses synchronization or a newly added node to efficiently retrieve synchronization information from its neighbors during their inactivity period. In some embodiments, the NTP manager 627 is active only on the sink and interacts with an external gateway 612 to synchronize the sink with an external entity. In some embodiments, the collection tree protocol 622 builds and maintains the routing tree. In some embodiments, the management system 620 can embed a link estimator, forwarding engine, and routing engine modules. In some embodiments, the routing engine can be configured to send and receive beacons as well as create and update a routing table. In some embodiments, the forwarding engine forwards data frames, and the link estimator is responsible for determining a quality of a communication link. In some embodiments, after completion of the RI interval, switching of the MAC protocol happens from CSMA/CA to X-MAC protocol. After switching, X-MAC related files can be configured to send and receive packets in DCI interval in some embodiments.

Figure 7:
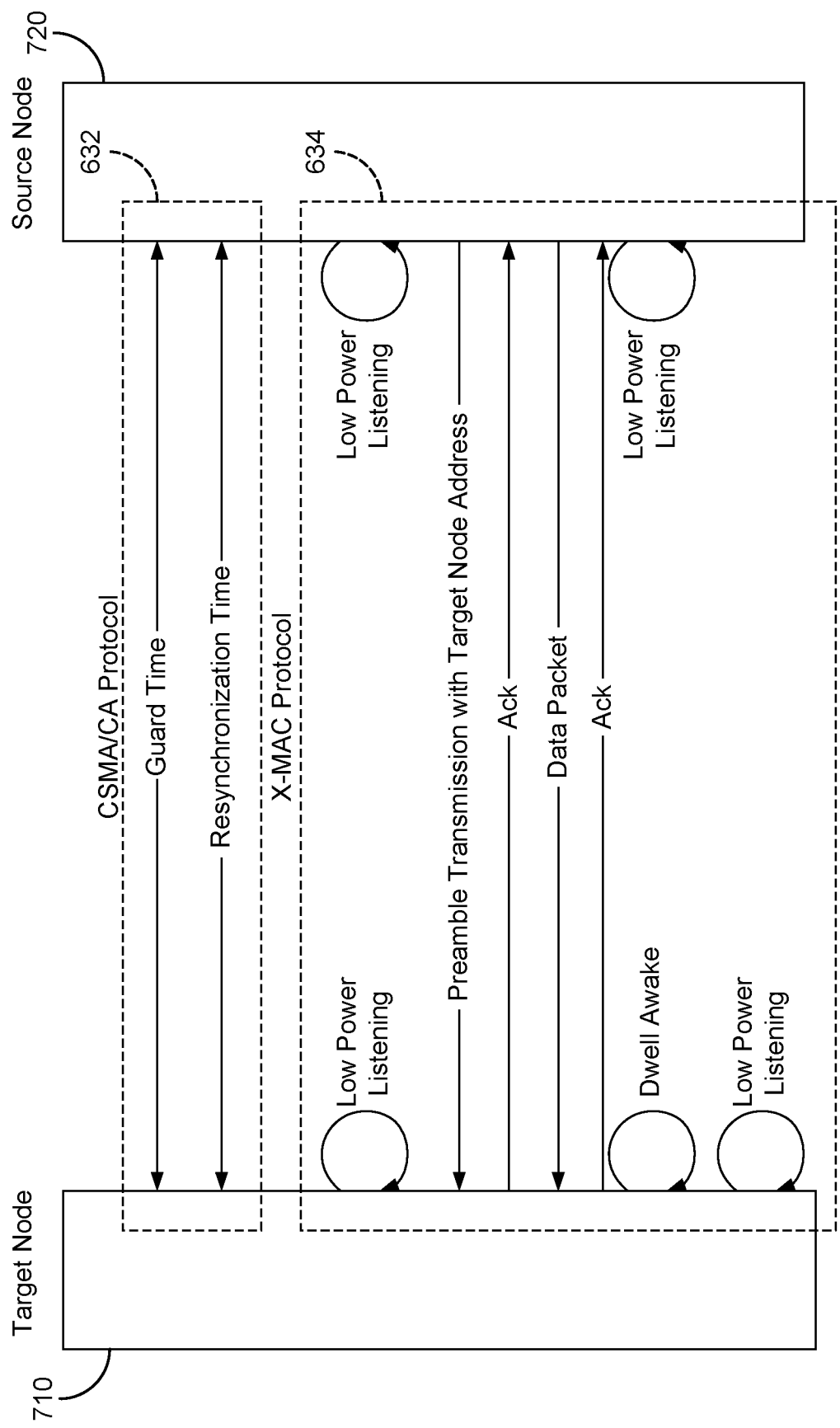
FIG. 7 is a process diagram depicting an exemplary transmission sequence for a node of the wireless sensor network without another source transmitting to a receiver, according to some embodiments.
Figure 8:
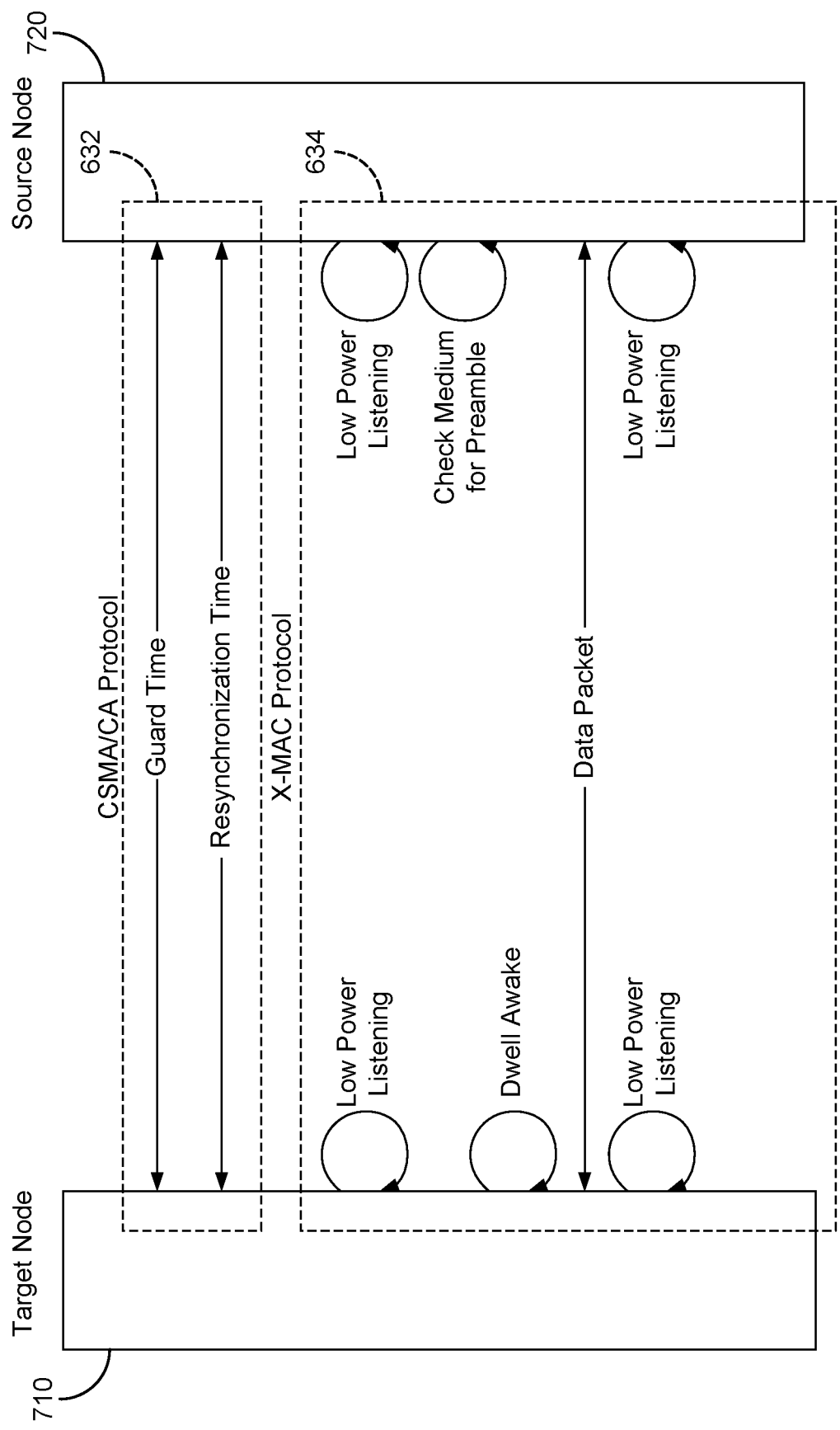
FIG. 8 is a process diagram depicting another exemplary transmission sequence for a node of the wireless sensor network when another source is transmitting to a receiver, according to some embodiments.

Referring to FIGS. 7-8, a target node 710 and a source node 720 can be configured for wireless communication. During the GT and RI, the CMSA/CA protocol 632 can be implemented quickly to build the tree and compensate for clock drifts quickly with the transceiver operating at a high (e.g., up to 100%) duty cycle. Following the GT and RI, the X-MAC protocol 634 can be used where the nodes 710, 720 can enter a LPL (low power listening) mode after the RI while awaiting the data collection interval. When a node wants to send data, the source node 720 can send a preamble with the address of a target node 710 and the source node 720 contained therein. Once the target node 710 encounters a preamble while in the LPL state, the target node 710 can check for the target address in the preamble. If the target address doesn't match the target node's address, then the target node 710 can return to the LPL state. If the target address matches the target node's address then the target node 710 can send an acknowledgement to the source node 720 of the preamble and finally the source node 720 can send the data packet to the target node 710, which can respond with an acknowledgement. The source node 720 can return to a LPL state after receiving the acknowledgement. The target node 710 can enter a dwell awake state for a predetermined time period to receive any additional transmitted data packets from other source nodes 720. In some implementations, the predetermined time period for the dwell awake state can be set (or reset) after a subsequent data packet is received. After the predetermined time period, the target node 710 can become a source node 720 to transmit one or more data packets to another target node 710 and/or can enter into a LPL state.

Sometimes, multiple source node 720 transmitters are under contention to send the data to same target node 710. In such conditions, the source node 720 can check the medium, as shown in FIG. 8, and if the source node 720 finds that a preamble has been sent by some other source node to the same target node 710, then the source node 720 can take a back-off time period that is long enough for other source node to complete its transmission. After the back-off time period, the source node 720 can send the data packet to the target node 710 without sending a new preamble transmission, because the target node 710 can dwell awake for a predetermined time period after sending an acknowledgement to the previous source node. The source nodes 720 can be configured to go into LPL responsive to receiving the acknowledgment from the target node 710 or, in the case of multiple data packets, responsive to the final acknowledgement from the target node 710.

If the target node 710 has upstream parent nodes and downstream children nodes, then the target node 710 can store the data received from one or more source nodes 720 in a buffer queue. The target node 710 can receive data from any of the source nodes 720 that it is a child node to and can immediately proceed as a source node 720 for an upstream parent that is a target node 710 and can forward the data packets to the parent target node 710 using the process from FIGS. 7-8. Using this approach there can be a reduction in the duty cycle percentage of each node.

Figure 9:
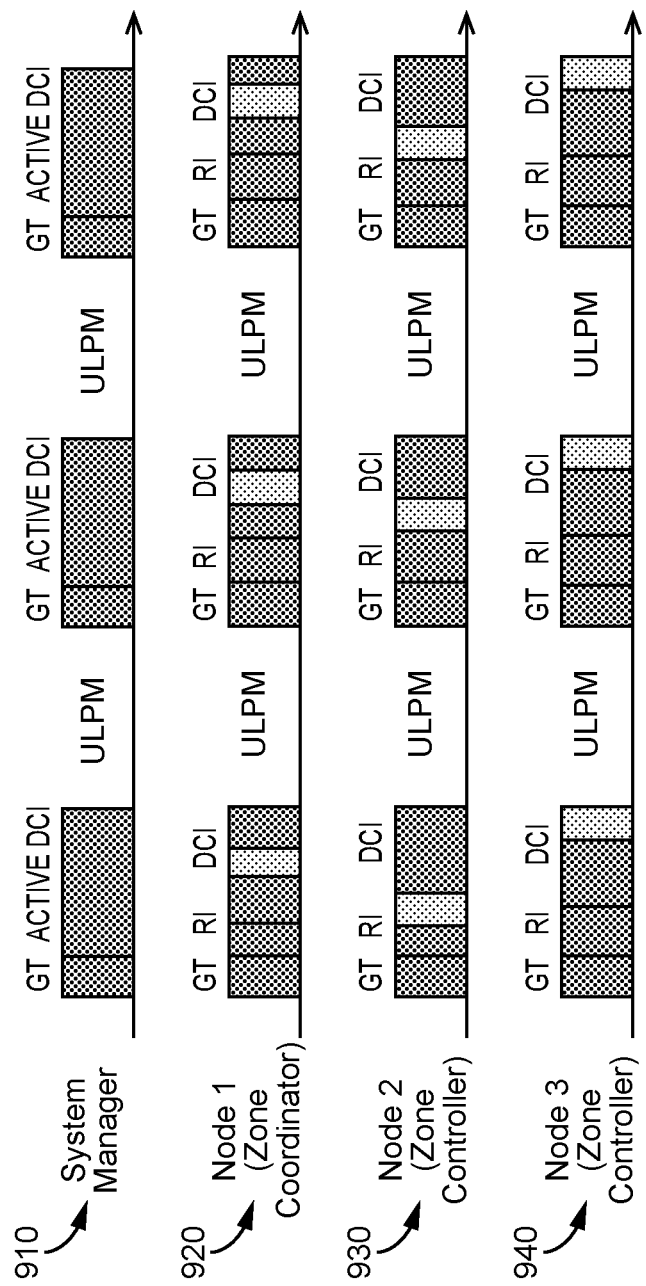
FIG. 9 is a diagram of timelines for guard time, resynchronization intervals, data collection intervals, and low power listening modes without implementing the adaptive MAC protocol, according to some embodiments.
Figure 10:
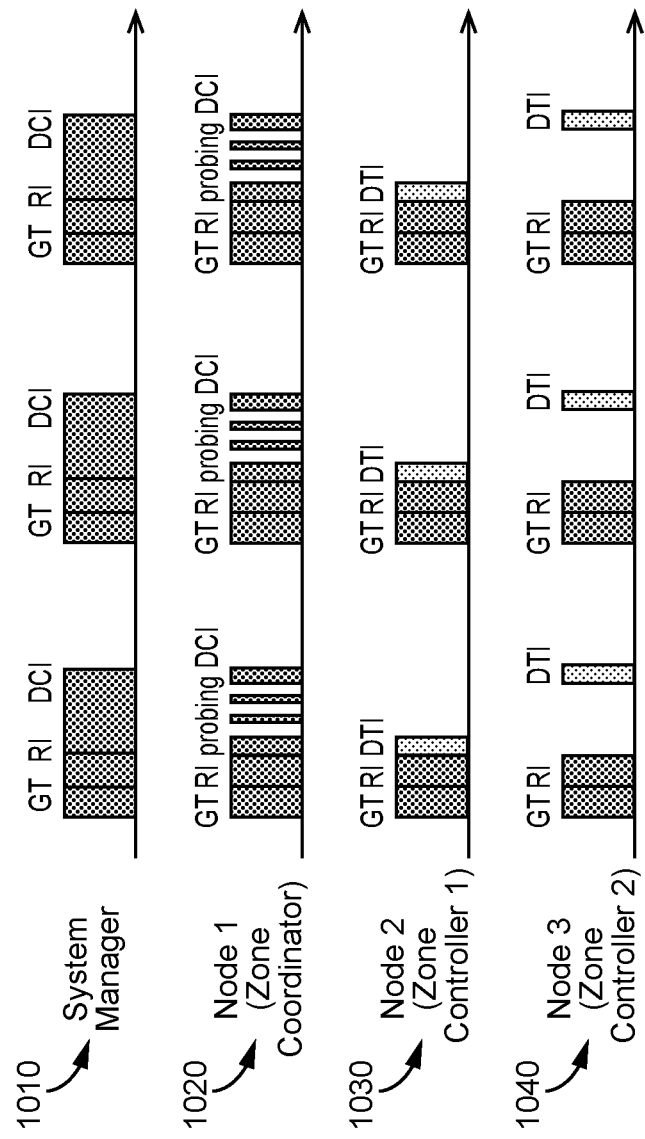
FIG. 10 is a diagram of timelines for guard time, resynchronization intervals, data collection intervals, and low power listening modes implementing the adaptive MAC protocol, according to some embodiments.

FIG. 9 depicts a diagram of timelines 910, 920, 930, 940 for a system manager (timeline 910) and respective nodes (920, 930, 940) for guard time, resynchronization intervals, data collection intervals, and LPL modes without implementing the adaptive MAC protocol. FIG. 10 depicts a diagram of timelines 1010, 1020, 1030, 1040 for a system manager (timeline 1010) and respective nodes (1020, 1030, 1040) for guard time, resynchronization intervals, data collection intervals, and LPL modes implementing the adaptive MAC protocol described herein. As shown in FIG. 10, the ON time can be reduced in the Data Collection Interval (DCI) and thus can reduce the overall duty cycle and increase the network size, thereby improving the scalability.

Figure 11:
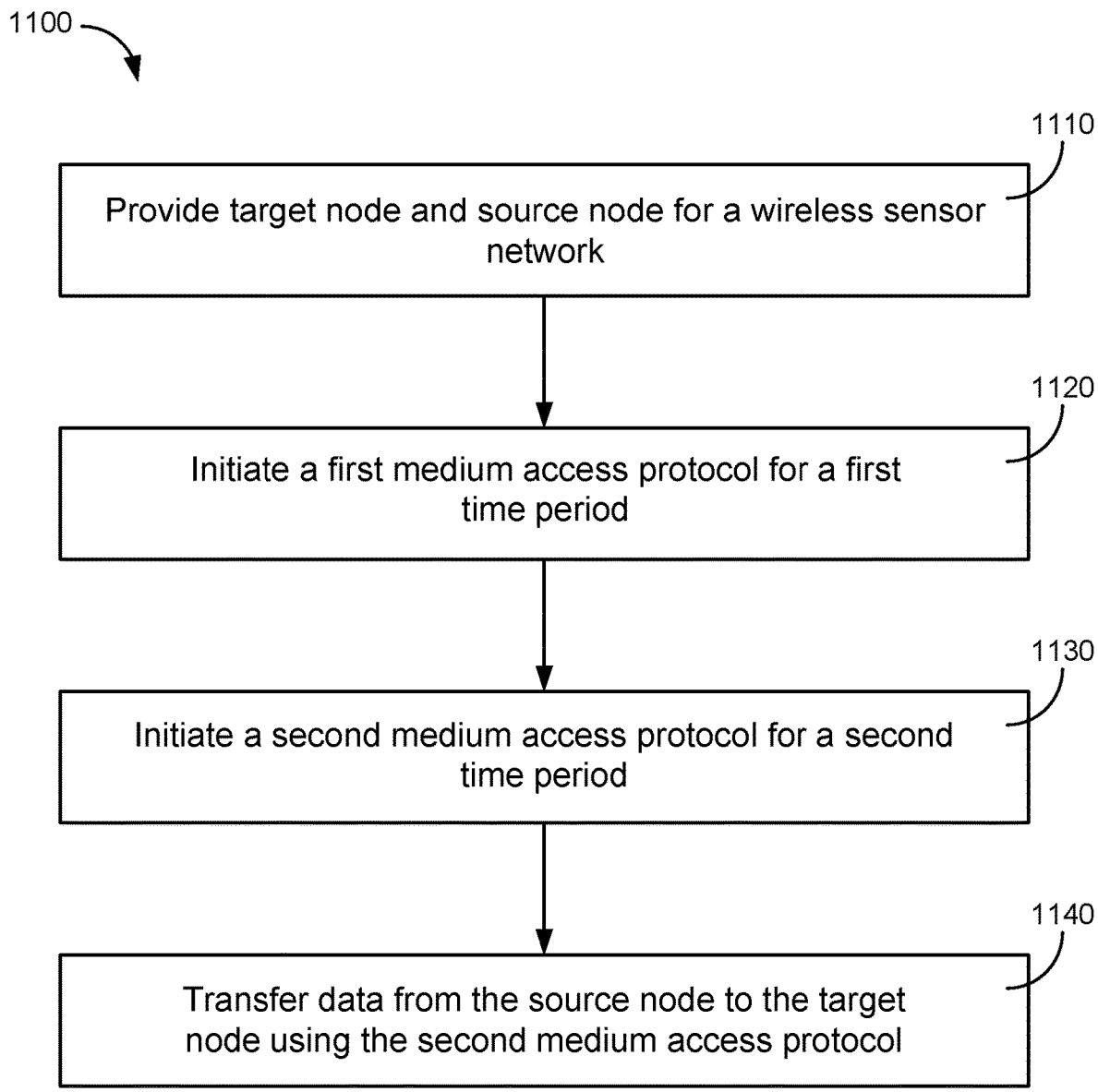
FIG. 11 is a flow diagram depicting an exemplary process for adaptively using multiple MAC protocols between a source node and a target node, according to some embodiments.

Referring now to FIG. 11, a flow diagram of an exemplary process 1100 is shown for adaptively using multiple MAC protocols between a source node and a target node according to some embodiments. The process 1100 can include providing a target node and a source node for a wireless sensor network (block 1110). The source node can be part of a source building management system device. The target node can be part of a target building management system device. The source node and the target node can be communicatively coupled via a wireless sensor network to communicatively couple the source building management system device with the target building management system device. The wireless sensor network can use a protocol stack architecture that includes an application layer with an adaptive engine, a network layer with a collection tree protocol, an adaptive multiple MAC layer, and a physical layer.

The process 1100 can include initiating a first MAC protocol for a first time period (block 1120). The adaptive multiple MAC layer protocol includes two interval periods: an active period where it operates with 100% duty cycle and a low power listening (LPL) mode where the duty cycle is minimized. It can divide the active period into three intervals: (1) a guard time (GT), (2) a resynchronization interval (RI) and (3) a data collection interval (DCI). In some embodiments, the purpose of GT can be to take into account any clock drifts and provide a buffer to all the nodes since the nodes were under long inactivity periods during the ultra-low power listening modes. In some embodiments, the RI can be responsible for compensating the clock drifts, sharing the duration of each interval of next cycle, and a collection tree can be built with sink as the root of the tree network. By the end of the RI, each node as a parent selected in the tree can share a common wake-up time for the next active period. For the above two intervals, a first MAC protocol, such as a CMSA/CA MAC protocol, can be used during a first time period, such as during the GT and the RI. During the first time period, a tree can be built and clock drifts can be compensated. In some implementations, the transceivers for the source node and target node can operate with a 100% duty cycle during GT and RI periods.

The process 1100 can include initiating a second MAC protocol for a second time period (block 1130). In some embodiments, the second time period can include the data collection interval. During the DCI, a second MAC protocol, such as an X-MAC protocol, can be implemented. The X-MAC protocol is a preamble based and transmitter initiated MAC protocol. Following the guard time and resynchronization interval, second MAC protocol can be used where the source node and target node can enter a LPL mode after the first time period while awaiting a data collection interval.

The process 1100 can further include transferring data from the source node to the target node using the second MAC protocol (block 1140). That is, when a node wants to send data during the second time interval, the source node can send a preamble with the address of a target node contained therein. Once the target node encounters a preamble while in the LPL state, the target node can check for the target address in the preamble. If the target address doesn't match the target node's address, then the target node can return to the LPL state. If the target address matches the target node's address then the target node can send an acknowledgement to the source node of the preamble. The source node can send the data packet to the target node, which can respond with an acknowledgement. The source node can return to a LPL state after receiving the acknowledgement. The target node can enter a dwell awake state for a predetermined time period to receive any additional transmitted data packets from other source nodes. In some implementations, the predetermined time period for the dwell awake state can be set (or reset) after a subsequent data packet is received. After the predetermined time period, the target node can become a source node to transmit one or more data packets to another target node and/or can enter into a low power listening state.

Sometimes, multiple source node transmitters are under contention to send the data to same target node. In such conditions, the source node can check the medium and, if the source node finds that a preamble has been sent by some other source node to the same target node, then the source node can take a back-off time period that is long enough for other source node to complete its transmission. After the back-off time period, the source node can send the data packet to the target node without sending a new preamble transmission, because the target node can dwell awake for a predetermined time period after sending an acknowledgement to the previous source node. The source nodes can be configured to go into LPL responsive to receiving the acknowledgment from the target node or, in the case of multiple data packets, responsive to the final acknowledgement from the target node.

If the target node has upstream parent nodes and downstream children nodes, then the target node can store the data received from one or more source nodes in a buffer queue. Once the target node receives the data packets from all the source nodes that are children nodes, the target node can then proceed as a source node for an upstream parent as a target node and can forward the data packets to the parent target node using the process 1100. Using this approach there can be a reduction in the duty cycle of each node.

For instance, an implementation without using two or more MAC protocols for a test period of 5 hours with one sink and five nodes and a sampling period of 1 minute can result in an overall duty cycle of 1.29%, a total on time of 0.774 seconds over a 60 second period, a total off time of 59.226 seconds over the 60 second period, a percentage idle time of 29.99%, and a total battery life of 2.43 years for an implementation with 2000 mAh batteries. In this case, a maximum of four direct child nodes are supported by the sink. An implementation using two or more MAC protocols for the test period of 5 hours with one sink and five nodes and a sampling period of 1 minute can result in an overall duty cycle of 0.61%, a total on time of 0.366 seconds over a 60 second period, a total off time of 59.634 seconds over the 60 second period, a percentage idle time of 8.45%, and a total battery life of 3.45 years for an implementation with 2000 mAh batteries. In this case, a maximum of seven direct child nodes are supported by the sink.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system comprising:
    a data network configured to wirelessly communicate data;
    a source device configured to wirelessly communicate data, wherein the source device comprises a sensor configured to measure an environmental condition; and
    a target device configured to wirelessly communicate data;
    wherein the target device and the source device utilize a first medium access control (MAC) protocol during a first time interval of a duty cycle and a second MAC protocol during a second time interval of the duty cycle.

2. The system of claim 1, wherein the first time interval includes a guard time interval and a resynchronization interval and wherein the second time interval includes a data collection interval.

3. The system of claim 1, wherein the first MAC protocol is a carrier-sense multiple access protocol.

4. The system of claim 1, wherein the second MAC protocol is an X-MAC protocol.

5. The system of claim 1, wherein the target device receives multiple data packets during the second time interval, at least one data packet of the multiple data packets is received from the source device and at least a second data packet of the multiple data packets is received from a second source device.

6. The system of claim 5, wherein the target device includes a buffer queue to store the multiple data packets.

7. The system of claim 1, wherein the target device is configured to enter a low power listening (LPL) mode after the resynchronization interval.

8. The system of claim 7, wherein the source device is configured to transmit an initiation data packet, the initiation packet having a preamble with a target address.

9. The system of claim 8, wherein the target device is configured to receive the initiation data packet, determine if the target address matches an address of the target device, and in response to the target address matching the address of the target device, send an acknowledgement data packet to the source device, the acknowledgement data packet including an indication that the target address matches the address of the target device.

10. The system of claim 9, wherein in response to the target address not matching the address of the target device, the target device is configured to enter the LPL mode.

11. A building management system (BMS) comprising:
a wireless sensor network (WSN) configured to communicate data among a plurality of BMS devices;
a source device configured to wirelessly communicate data; and
a target device configured to wirelessly communicate data;
wherein the target device and the source device utilize a first medium access control (MAC) protocol during a first time interval of a duty cycle and a second MAC protocol during a second time interval of the duty cycle;
wherein the target device receives multiple data packets during the second time interval, at least one data packet of the multiple data packets is received from the source device and at least a second data packet of the multiple data packets is received from a second source device.

12. The BMS of claim 11, wherein the first time interval includes a guard time interval and a resynchronization interval and wherein the second time interval includes a data collection interval.

13. The BMS of claim 11, wherein the first MAC protocol is a carrier-sense multiple access protocol and wherein the second MAC protocol is an X-MAC protocol.

14. The BMS of claim 11, wherein the source device is a sensor configured to measure an environmental condition.

15. The BMS of claim 11, wherein the target device is configured to enter a low power listening (LPL) mode after the resynchronization interval.

16. The BMS of claim 15, wherein the source device is configured to transmit an initiation data packet, the initiation packet having a preamble with a target address.

17. The BMS of claim 16, wherein the target device is configured to receive the initiation data packet, determine if the target address matches an address of the target device, and in response to the target address matching the address of the target device, send an acknowledgement data packet to the source device, the acknowledgement data packet including an indication that the target address matches the address of the target device.

18. The BMS of claim 17, wherein in response to the target address not matching the address of the target device, the target device is configured to enter the LPL mode.

19. A method for exchanging data in a building network, the method comprising:
using a first medium access control (MAC) protocol during a first time interval of a duty cycle to wirelessly communicate data between a source device and a target device;
using a second MAC protocol during a second time interval of the duty cycle to wirelessly communicate collection data between the source device and the target device;
wherein the collection data comprises sensor data indicating an environmental condition.

20. The method of claim 19, wherein the first MAC protocol is a carrier-sense multiple access protocol and the second MAC protocol is an X-MAC protocol.

* * * * *